June 7, 1960     J. BOLTON ET AL     2,939,554
SPACE DECKS AND COMPONENTS THEREFOR
Filed April 22, 1955     6 Sheets-Sheet 4

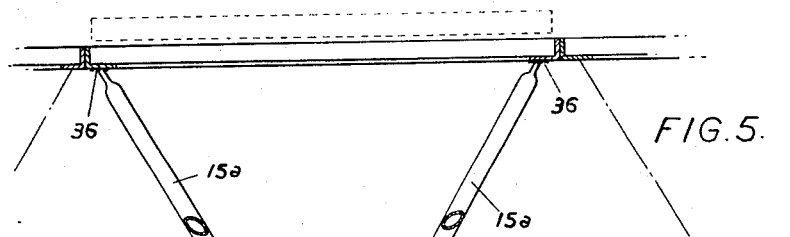
FIG.5.
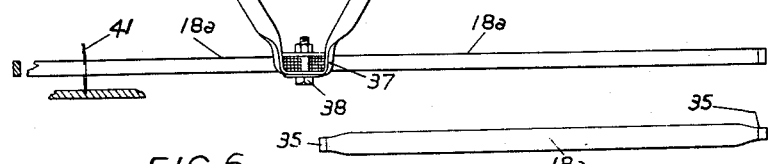
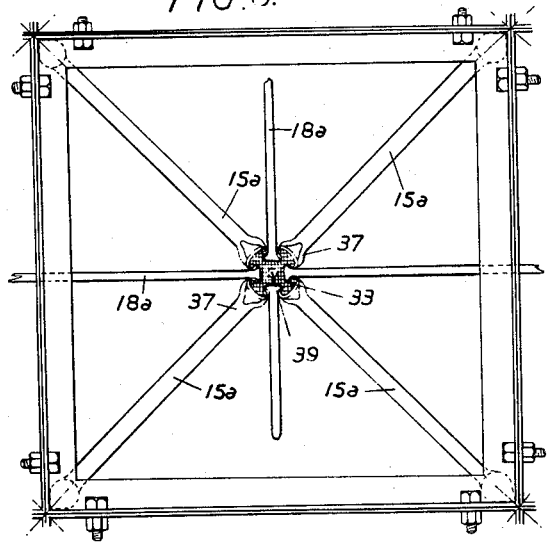
FIG.6.
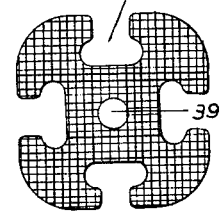
FIG.7.
FIG.8.

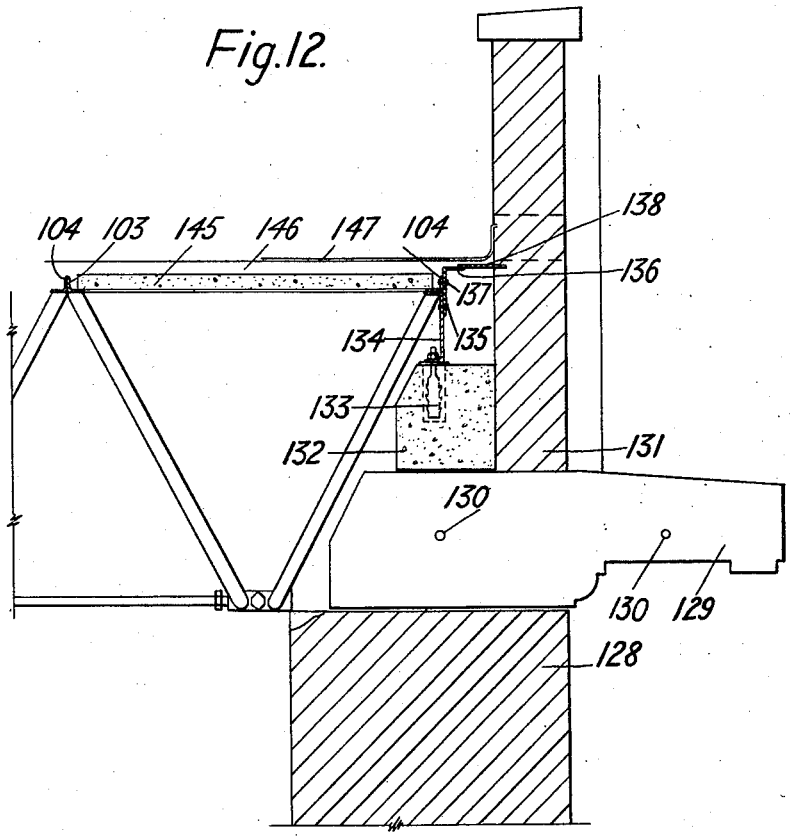

United States Patent Office 2,939,554
Patented June 7, 1960

2,939,554

SPACE DECKS AND COMPONENTS THEREFOR

John Bolton and Desmond Edward Hennessey, London, England, assignors to Space Decks Limited, London, England Filed Apr. 22, 1955, Ser. No. 503,092

7 Claims. (Cl. 189—34)

The present invention relates to space decks and components for the construction thereof.

It is an object of the present invention to provide components from which space decks of various shapes and sizes may be constructed, which components may be of standard size e.g. of modular size.

In constructing the space decks, for example roofs or floors spanning large distances it has in the past been the practice to provide main load-bearing members made up of structural sections and designed to span the whole of the floor space or roof space which it is desired to cover. This has normally necessitated the prefabrication of main beams or trusses of lengths appropriate for a particular job. Not only has the actual prefabrication of non-standard members contributed heavily to the cost of large span work and required considerable planning, but the members when constructed have been large and cumbersome and therefore expensive to transport.

In accordance with the present invention there is provided a component for a space deck which component comprises a compression member consisting of a planar frame defining an obstruction-free planar central area said frame being formed with re-entrant formations at its periphery and having the peripheral configuration of an individual polygonal cell of a regular planar array of polygonal cells, a junction unit spaced from the plane of the compression member and being formed with tension member securing formations positioned to secure a plurality of tension members arranged in such directions as by tensional forces to restrain said junction unit against movement in any direction parallel with the plane of the compression member, a set of struts connected between the junction unit and the compression member, the compression member having one of the struts connected thereto in a position substantially at each corner and the arrangement being such that a plurality of similar components may be arranged with the junction unit of one component projecting through the compression member of the next component and occupying a position adjacent to the junction unit of said next component.

Further in accordance with the present invention there is provided a space deck comprising a plurality of components as aforesaid, the compression members of which components are arranged in a planar array and restrained against relative displacement by rection between their re-entrant formations and the junction units of which are restrained against separation by tension members secured by the tension member securing formations.

The component conveniently has its compression member provided in the form of a rebated frame into which a slab of concrete or other convenient material may be fitted. A weatherproof finish may be given to a space deck assembled from such components and slabs by forming an impervious coating on its upper surface. In one convenient arrangement the slabs are made sufficiently thick to stand proud of the upper edges of the compression members and after assembly of the deck, there is applied a screeding concrete and a layer of roofing felt. Both slabs and screeding are preferably formed of aerated concrete the slabs, if desired, being reinforced with, for example, a metallic mesh.

In a preferred form of the present invention the compression members are so formed as to provide an imperforate array, although with compression members of certain peripheral polygonal configuration for example octagonal configuration there remains a regular array of voids which may be filled in with separate polygonal components (e.g. separate square components in the case of octagonal compression members) if desired.

A set of like components of the type provided by the present invention can necessarily be fitted together with the compression members uppermost and with the straight edges of the compression members arranged in contact to form a composite planar compression surface showing thereon a planary array of polygonal cells. By linking together the junction units by means of tension members secured by the tension member securing formations, the set of components may be formed into a stable load-bearing space deck structure. Displacement of the compression members out of the plane of said compression surface is prevented or may be prevented—depending upon their form—by cooperation between the re-entrant formations. It is most convenient to provide the re-entrant formations in the form of holes positioned to allow adjacent compression members to be bolted together. Other forms of re-entrant formations may however be provided, e.g. grooves and complementary tongues, pegs and complementary holes or depressions for locating sheer connectors inserted between adjacent compression members.

An assembly of maximum strength is obtained by using sufficient units to fill with compression members, the whole of the area to be decked i.e. by arranging the compression members in a closely packed array. Where however lesser strength is required, some units may be omitted, the resulting assembly for example consisting of intersecting beams each beam being formed of a plurality of the units.

The tension member securing formations of the junction unit may take any convenient form for example, hooks, eyes, links or tongues or apertures adapted to key with complementary formations on the tension members to be employed. In one preferred form of the component the junction unit is in the form of a block provided with tension members securing formations in the form of a plurality of inwardly widened slots distributed round its periphery. Blocks of this type are readily cut from an extrusion moulding of corresponding section.

In another preferred form of the component the junction unit is provided with tension member securing formations in the form of screw threads. This arrangement is particularly useful when a set of components has the screw threads so arranged that tension rods bearing at their ends screw threads of opposite hand may be employed thus facilitating assembly and adjustment after assembly e.g. to introduce or remove a slight curvature in the assembled space deck. Where the junction unit is provided with tension member securing formations arranged in pairs, each pair being so disposed as to secure a pair of tension members positioned to react on the junction unit in opposite directions which are co-linear or parallel, one tension member securing formation of each pair may be provided in the form of a left hand thread and the other in the form of a right hand thread, thus enabling a space deck to be assembled from a set of similar components all similarly oriented. As will be understood, a set of components which require different orientations or which is formed, not of similar components, but of complementary components e.g. half with all the tension member securing formations in the form of right hand threads and half with all the tension member securing formations in the form of left hand threads—is the more difficult to assemble by uneducated labour.

The tension member securing formations are preferably provided in such positions as to accommodate tension members connecting the junction unit with the junction units of all those components which, in an assembled space deck have a side contacting a side of said component; for example components having square or rectangular compression members are preferably provided with units having four tension member securing formations disposed there-around at 90° intervals, such one facing in the same direction as a side of the compression member. Other arrangements however are possible though usually less convenient. Thus one may provide a component having a square compression member with a junction unit having only three tension member securing formations, the three tension member securing formations being positioned to face in the same directions as one side and the two opposite corners of the compression member. Whatever arrangement is adopted the securing formations should be positioned to secure at least three tension members arranged in at least two non-colinear directions. In this way the tension members serve to provide longitudinal forces sufficiently to restrain the junction unit against movement in any direction parallel with the plane of the compression member.

In assembling a space deck from a set of components of the present type, it is usually most convenient to produce a series of beams by operatively securing rows of components together with tension members arranged in the longitudinal directions of the beams; position the beams side by side across the space to be decked and then arrange tension members in the transverse direction. Assembly by this procedure is facilitated when the components are provided with compression members of a square or other configuration which provides a pair of mutually parallel opposite sides and have among their tension member securing formations, a pair of formations positioned to receive tension members; arranged in a direction which is perpendicular to the direction of said pair of sides.

In order to illustrate the invention there now follows a description of various specific embodiments thereof. This description is to be read in conjunction with the accompanying drawings, wherein:

Figure 5 is a partial side view with parts in section showing another modification of the invention.

Figure 6 is a plan view of the construction shown in Figure 5.

Figure 7 is a cross-sectional view of the junction unit used in the modification of Figure 5.

Figure 8 is a side view showing the welding of a flattened end of a tube to the corner of the compression member.

Figure 12 is a partial side view illustrating how the space deck may be secured to the wall of a building.

Figure 13 is a partial side view showing how the space deck may be connected to a vertical wall.

Figure 1:
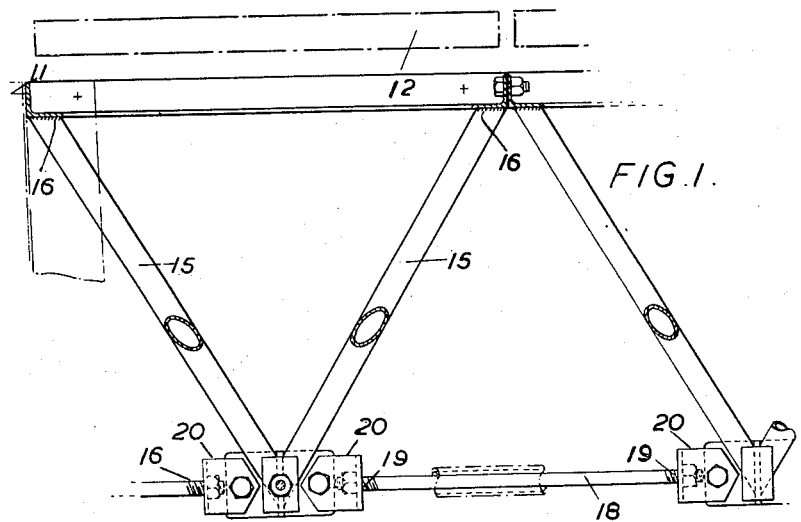
Figure 1 is a partial side view with parts shown in section of one form of space deck.
Figure 2:
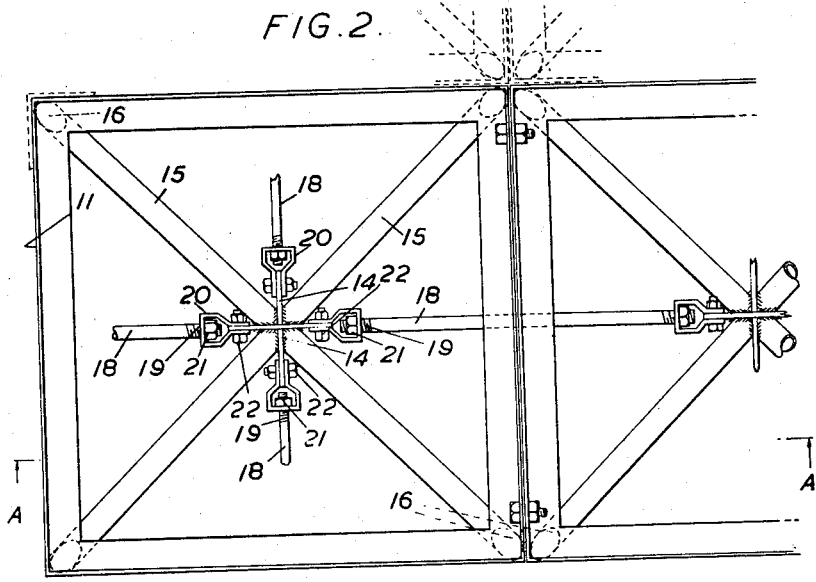
Figure 2 is a plan view of the construction shown in Figure 1.

In the form of component shown in Figures 1 and 2 the compression member 11 consists of a square rebated horizontal frame formed of angle iron of such size as to accommodate a standard concrete slab 12. One longer length 13 and two shorter lengths 14 of flat iron bar are arranged on edge in the form of a cross positioned below the compression member 11, the arms of the cross and the sides of the compression member being parallel. Four tubular struts 15 of equal length, appropriately shaped at their ends, are welded in position between the corners 16 of the compression member and the angles of the cross thereby providing a rigid junction unit. Opposite pairs of struts diverge from the junction unit 17 at an included angle of about 80°. Holes drilled horizontally through the four free ends of the flat bars enable tension members 18 to be secured thereto.

Tension members for connecting the junction units together are conveniently provided in the form of rods, the ends 19 of which are screw-threaded and provided with link pieces 20 formed of heavy gauge metal strips secured in position by means of retaining nuts 21. Holes formed through the ends of the link pieces enable the tension members to be bolted in position by means of bolts 22 between the corresponding flat bars of adjacent junction units.

Figure 3:
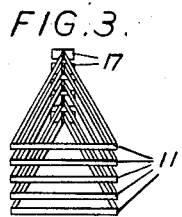
Figure 3 is a reduced perspective view showing how the components in the form of the invention shown in Figure 1 may be stacked.
Figure 4:
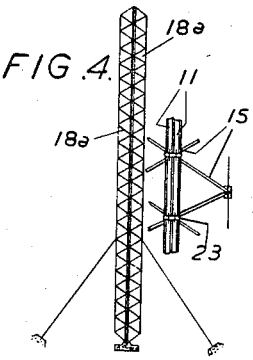
Figure 4 is a reduced perspective view showing how the components of the form shown in Figure 1 may be erected to form a pylon.

Components of the foregoing type are, since their compression members are in form of open rectangular frames, capable of being stacked together with their junction units in proximity as shown in Figure 3, and thus may be stored and transported economically. They are also capable of erection to form a pylon as shown in Figure 4. To this end pairs of the components are placed together with their compression units 11 face to face and secured by bolting gusset plates 23 between adjacent holes. The pairs of compression units are then bolted together edge to edge and the pylon completed by connecting adjacent junction units together by means of tension members 18a.

A further embodiment of the invention is shown in Figures 5 and 6. This embodiment resembles that of Figure 1, the main difference lying in the form of the junction units and the form of the tension members to be employed. The junction unit consists of a block 33 cut from an extrusion moulding having a cross section as shown in Figure 7 and therefore having at its four sides channels 34 of inwardly increasing width. These channels serve to accommodate complementarily formed ends 35 of tension members 18a in the form of metal rods of appropriate length. The four struts 15a are provided in the form of two metal tubes flattened at their centres and at their ends. The flattened ends 36 of each tube are welded, as shown most clearly in Figure 8, to diagonally opposite corners of the angle-iron compression member while the flattened centre portions 37 are bent round the underside of the block 33, as shown most clearly in Figure 5, and secured thereto by means of bolts passed through holes 38 formed in the flattened centre portions in positions corresponding with a hole 39 of a similar size formed through at the centre of the block. After bolting together the compression members of a set of components, the tension members may be secured in position by driving said complementarily shaped ends 35 from below into the channels 34 formed in the blocks.

Figure 9:
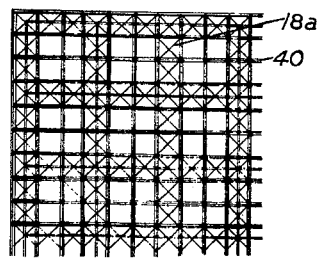
Figure 9 is a schematic view showing a modification of the construction shown in Figure 5.

As indicated in Figure 9 certain of the tension members 18a may be replaced by similarly ended compression members, e.g. tubular compression members 40, to cater for any reversed stresses which appear in the finished structure when loaded.

Figure 10:
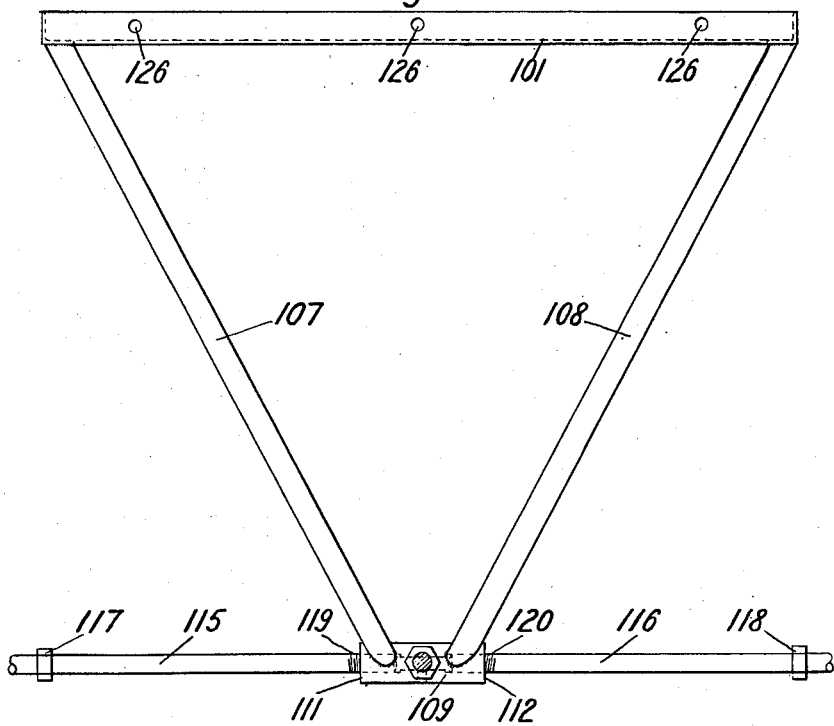
Figure 10 is a partial side view of a further modification.
Figure 11:
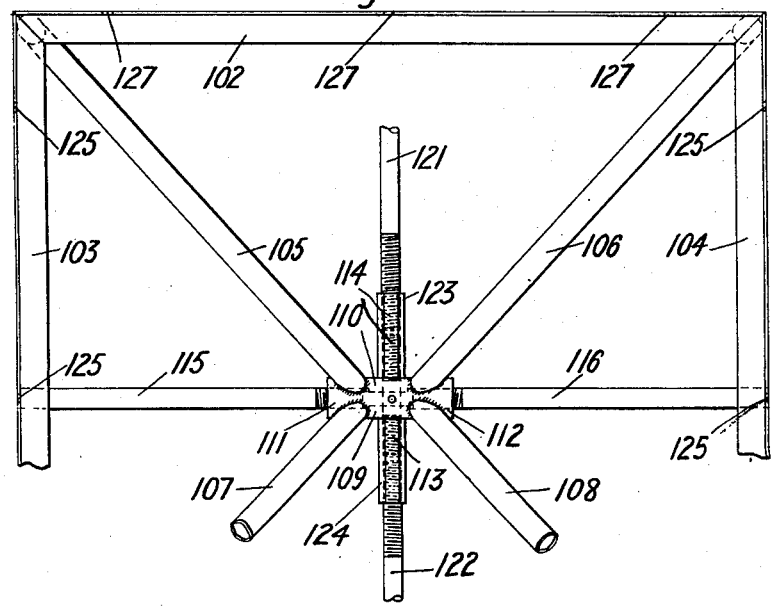
Figure 11 is a partial plan view of the modification shown in Figure 10.

A further embodiment of a component constructed in accordance with the invention is shown in elevation in Figure 10 and in plan in Figure 11. In this component the compression member consists of a square rebated frame of outside dimensions 4' formed from 4 lengths of 2" x 3 x 3 3/16" angle iron 101, 102, 103 and 104 mitred at their ends where they are welded to tubular struts 105, 106, 107 and 108 formed of 1 11/16" outside diameter 9 gauge steel tubing. The struts at their lower ends are in turn welded to an 8" length of 2½" diameter mild steel bar 109 which forms part of the junction unit. This mild steel bar is drilled axially to provide a bore 110 which at end 111 is tapped to provide a right hand female thread and at end 112 is tapped to provide a left hand female thread. The piece 109 is also drilled transversely to provide a bore through which is passed a 7½" length of 1¼" mild steel bar. This bar is threaded from its ends with male threads which extend inwardly over a distance of 2¾" and thus terminate at positions lying just within the transverse bore. Small tack welds retain the male threaded bar in position. The male thread on projecting portion 113 is of right hand configuration while the male thread on projecting portion 114 is of left hand configuration.

As shown in Figures 10 and 11 the component has four tension members secured thereto by the four screw threads. Tension members 115 and 116 are provided in the form of 3' 9" lengths of 1¼" mild steel rod to the centres to which are welded hexagonal nuts 117 and 118 for the purpose of providing purchase for a spanner. The tension members 115 and 116, which are identical in size and form, are each formed at one end with a male thread at 119 of right hand configuration and at their opposite ends 120 with a male thread of left hand configuration.

The two remaining tension members 121 and 122 are provided in the form of 3' 3½" lengths of 1¼" mild steel rod having, like tension members 115 and 116, nuts (not shown) welded at their centres. These tension members 121 and 122 are identical and have male threads formed at their ends over a length of 5½", the thread at one end being of left hand configuration and the thread at the opposite end of right hand configuration. The tension members 121 and 122 are each provided at each end with a socket consisting of a 5¼" length of mild steel hexagon bar (1.86" across flats) appropriately drilled and tapped. Of the two sockets shown in Figure 11, socket 123 has a right hand female thread while the socket 124 has a left hand female thread.

Components of the type shown in Figures 10 and 11 may be assembled to form a space deck as follows: A number of components sufficient to form a row extending across the area to be decked, is joined together by bolting the side 103 of the compression member of one component to the side 104 of the compression member of the next component by means of bolts passing through holes 125 formed in the sides of the compression members and at the same time screwing a set of tension members, all identical with tension members 115 and 116 into position. The process is repeated until there is produced a sufficient number of rows of components to cover the area completely when placed in contact side by side, in which position they may be secured together to form a rigid two-dimensional structure by passing bolts through holes 126 and 127 formed in sides 101 and 102 of the compression members and interconnecting their junction units by means of a plurality of tension members 121 and 122 identical with tension members 115 and 116. These tension members are brought into position with their sockets 123 and 124 screwed substantially completely on to the male threads of the tension members 121 and 122. The sockets are then screwed on to the male threads 113 and 114 of the junction units. In Figure 12 there is shown by way of example a manner in which end bearings may be provided for the space deck thus formed. In this particular case the components unite to form the load-bearing portion of a flat roof.

In Figure 12 the upper portion 128 of a wall of a building is surmounted by a cornice 129 of precast concrete containing reinforcement rods 130. The cornice is in turn surmounted by a 9" thick parapet 131 and a precast padstone 132 as shown. To the padstone is bolted by rag bolts 133, 3' lengths of 9" x 3" channel 134 placed in such positions as to have common centres with the sides 104 of the compression members. Across those sides of the channels which face the parapet 131 is bolted by bolts 135 a continuous length of 6 x 3 angle, 136 drilled in such positions as to accommodate bolts 137 passing through the holes 125 in the compression members. A continuous length of 6" x ¼" mild steel flat 138 is laid with one end resting on the horizontally projecting portion of the angle 136 with its other end located within the parapet 131. As will be appreciated, the channels 134 and the angle 136 provide a rebate in which the sides 104 of the compression members of the end components of the rows may rest. The spaces between the channel 134 accommodate the upper ends of the struts 106 and 108.

In Figure 13 there is shown for purposes of illustration the manner in which the space deck may be connected with a vertical wall 139 lying parallel with the final row of components. The wall 139 has grouted thereinto, a 9" length of 1¼" bore galvanised tube 140 greased internally to provide a sliding bearing for a tie rod 141 which in the case illustrated is identical in form with tension members 121 and 122, one socket however being removed. A continuous length of 2¼" x 2¼" angle 142 bolted to the sides 101 of the compression members of the units 142 locates the inner end of a reinforced concrete slab 143 formed in situ with its outer end 144 located in a slot in the wall 139.

The assembly space deck may have inserted in the angle iron rebated frames forming the compression member of each component, as shown most clearly in Figure 12 a reinforced slab 145 preformed of aerated concrete. The deck is rendered weatherproof by a screeding of aerated concrete 146 topped by a layer of three-ply roofing felt 147.

Figure 16:
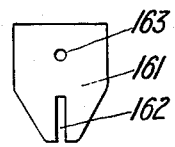
Figure 16 is a side view of a plate to which the tension members may be fastened.
Figure 14:
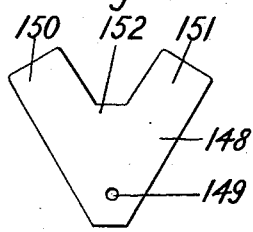
Figure 14 is a side view of a modified type of junction unit.
Figure 15:
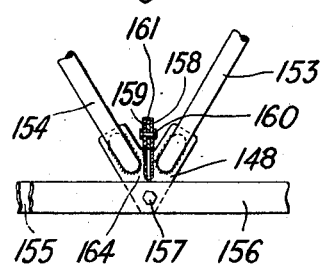
Figure 15 is a similar view of a further modification of the junction unit in which four tubular struts are welded thereto.

In Figure 14 there is shown a further type of junction unit suitable for incorporation in a component as provided by the present invention. This junction unit consists of a metal plate 148 cut to the shape shown and formed with a hole 149 in the position indicated. The two wings 150 and 151 of the plate 148 serve for the attachment by welding of four struts, one on each face of each wing. The portion 152 of the plate lying between the wings serves as a tension member securing formations as does the hole 149. A component provided with a junction unit of the type shown in Figure 14 is suitable for use in conjunction with tension members in the form of flat bars arranged to run continuously throughout the length and breadth of the space deck assembled from a set of said components. A typical arrangement is illustrated in Figure 15 where the junction unit 148 is shown having 4 tubular struts welded thereto. Of these struts, two struts only i.e. 153 and 154 are visible in Figure 15. The tension members running generally in the direction of the plane of junction unit 148 are provided in the form of 2 flat steel bars 155 and 156 appropriately drilled and secured in position by a bolt 157. The tension members arranged at right angles to the plate 148 consist of continuous flat bars 158 and 159 attached by a bolt 160 to a plate 161 formed, as shown in Figure 16, with a profile providing a slot 162 adapted to have a sliding fit over portion 152 of plate 148. The plate 161 is formed with a hole 163 for the accommodation of belt 160. Having dropped a continuous tension member provided with an appropriately spaced set of slotted plates of the type shown in Figure 16 over a corresponding plurality of junction units of the type shown in Figure 14 during the assembly of a space deck, the slotted plates can if desired be fixed in position by electric-arc or other welding as at 164.

Figure 17:
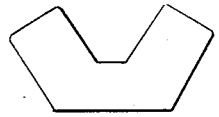
Figure 17 is an elevational view of a further modified junction unit.

As has been shown earlier in this specification a space deck may, where maximum strength is not required, be formed from a number of components less than the number required to fill the whole of the area to be decked. When such an arrangement is adopted a structure sufficiently strong for the purpose in hand is sometimes obtainable when some of the tension members are omitted. Thus besides components of the type provided in accordance with the present invention, components i.e. having junction units provided with tension member securing formations positioned to secure tension members arranged in such directions as to restrain the junction units against movement in any direction parallel with the plane of the compression members, there may in addition be employed components whose junction units are adapted to secure tension members running in only one direction; for example one may employ components having junction units in the form of plates shaped as shown in Figure 17. These junction units resemble the type shown in Figure 14 but omit the parts intended for securing tension members such as 155 and 156.

By the present invention there are provided space decks and components for the construction of space decks in a very simple and convenient form. The components of the invention are useful not only in the construction of space desks and pylons as indicated above, but also of such structures as bridge-decks, military assault bridges, false-work for large-span masonry arches, crane-supports, scaffolding and helicopter platforms. For the construction of masonry arches, the false-work, a curved formation of which is frequently required, may readily be constructed from components as provided by the present invention used with tension members of appropriately reduced or increased length.

Structures as provided by, or constructed from the components provided by the present invention make maximum use of the strength of the individual structural members in all three dimensions, particularly in a two-way space deck, resulting in the reduction of the depth of construction and in the lightness of apperance. The units may be made very light in weight and it is possible to provide large two-way structures in which the weight per square foot is, when using steel and even lower when using light alloy, as low as 7 pounds. The tension members in the finished structure provide a convenient frame work from which ceilings may be suspended if required, as for example at 41 in Figure 5.

Although components provided by the present invention are primarily intended to take compression in the portions termed "compression members" it will be appreciated that in certain structures, for example cantilevers, or arched or shell shaped two-way spans, it is necessary to provide for reversed stresses. In such cases, the shear connectors which are normally provided only in order to stand against displacement of adjacent units, must be capable of withstanding the tension forces produced. This condition is fulfilled when belts are employed as aforesaid. Furthermore the components termed "tension members" must be provided in such form e.g. tubular or flanged, as to withstand compression.

We claim:

1. A space deck comprising a plurality of nestable units, each unit consisting of a prefabricated pyramid comprising a base formed from girders welded at the corners to form a rectangular frame, a junction unit, strut members secured at the corners of said frame extending downwardly to said junction unit to which each strut member is secured, each junction unit comprising screw-threaded sockets whose axes extend in a direction parallel with the plane of said base and tension members provided at their ends with screw-threads of opposite hand cooperating with the complementary screw-threaded sockets in said junction unit, said nestable units being secured together by rigidly connecting the bases of adjacent pyramids together in abutting relation and by connecting adjacent junction units together by means of said tension members, said tension members being adjusted to tension said nestable units to at least compensate for the dead load deflection of said space deck.

2. A space deck comprising a plurality of nestable units, each unit consisting of a prefabricated pyramid comprising a base formed from girders welded at the corners to form a rectangular frame, a junction unit, strut members secured at the corners of said frame extending downwardly to said junction unit to which each strut member is secured, each junction unit comprising threaded means whose axes extend in a direction parallel with the plane of said base and tension members provided at their ends with threaded means of opposite hand cooperating with the complementary threaded means in said junction unit, said nestable units being secured together by rigidly connecting the bases of adjacent pyramids together in abutting relation and by connecting adjacent junction units together by means of said tension members, said tension members being adjusted to tension said nestable units to at least compensate for the dead load deflection of said space deck.

3. A space deck as set forth in claim 2 wherein said threaded means comprises a threaded stud secured to said junction unit and an internally screw-threaded collar cooperating with said stud.

4. A space deck comprising a plurality of nestable units, each unit consisting of a prefabricated pyramid comprising a base formed from L-shaped girders welded at the corners to form a rebated rectangular frame, a junction unit, strut members secured at the corners of said frame extending downwardly to said junction unit to which each strut member is secured, each junction unit comprising screw-threaded sockets whose axes extend in a direction parallel with the plane of said base and tension members provided at their ends with screw-threads of opposite hand cooperating with the complementary screw-threaded sockets in said junction unit, said nestable units being secured together by rigidly connecting the bases of adjacent pyramids together in abutting relation and by connecting adjacent junction units together by means of said tension members, said tension members being adjusted to tension said nestable units to at least compensate for the dead load deflection of said space deck.

5. A space deck comprising a plurality of nestable units, each unit consisting of a prefabricated pyramid comprising a base formed from girders welded at the corners to form a rectangular frame, a junction unit, strut members secured at the corners of said frame extending downwardly to said junction unit to which each strut member is secured, each junction unit comprising screw-threaded sockets whose axes extend in a direction parallel with the plane of said base and tension members provided at their ends with screw-threads of opposite hand cooperating with the complementary screw-threaded sockets in said junction unit, said nestable units being secured together by rigidly connecting the bases of adjacent pyramids together in abutting relation by bolts passing through the sides of said girders and by connecting adjacent junction units together by means of said tension members, said tension members being adjusted to tension said nesable units to at least compensate for the dead load deflection of said space deck.

6. A space deck comprising a plurality of nestable units, each unit consisting of a prefabricated pyramid comprising a base formed from girders welded at the corners to form a rectangular frame, a junction unit, tubular strut members welded at one end to the corners of said frame extending downwardly to said junction unit to which each strut member at its other end is welded, each junction unit comprising screw-threaded sockets whose axes extend in a direction parallel with the plane of said base and tension members provided at their ends with screw-threads of opposite hand cooperating with the complementary screw-threaded sockets in said junction unit, said nestable units being secured together by rigidly connecting the bases of adjacent pyramids together in abutting relation and by connecting adjacent junction units together by means of said tension members, said tension members being adjusted to tension said nestable units to at least compensate for the dead load deflection of said space deck.

7. A space deck comprising a plurality of nestable units, each unit consisting of a prefabricated pyramid comprising a base formed from girders welded at the corners to form a rectangular frame, a junction unit, strut members secured at the corners of said frame extending downwardly to said junction unit to which each strut member is secured, each junction unit comprising screw-threaded sockets whose axes extend in a direction parallel with the plane of said base and tie bar tension members provided at their ends with screw-threads of opposite hand cooperating with the complementary screw-threaded sockets in said junction unit, said nestable units being secured together by rigidly connecting the bases of adjacent pyramids together in abutting relation and by connecting adjacent junction units together by means of said tension members, said tension members being adjusted to tension said nestable units to at least compensate for the dead load deflection of said space deck.

References Cited in the file of this patent
UNITED STATES PATENTS

| | | |
|---|---|---|
| 1,475,349 | Marks | Nov. 27, 1923 |
| 1,995,248 | Herman | Mar. 19, 1935 |
| 2,216,732 | Brown | Oct. 8, 1940 |
| 2,433,677 | Thomas | Dec. 30, 1947 |
| 2,709,975 | Parker | June 7, 1955 |